(12) United States Patent
Arashi

(10) Patent No.: US 9,812,919 B2
(45) Date of Patent: Nov. 7, 2017

(54) INVERTER-INTEGRATED ELECTRICALLY DRIVEN COMPRESSOR

(71) Applicant: MITSUBISHI HEAVY INDUSTRIES AUTOMOTIVE THERMAL SYSTEMS CO., LTD., Kiyosu-shi, Aichi (JP)

(72) Inventor: Noriaki Arashi, Tokyo (JP)

(73) Assignee: MITSUBISHI HEAVY INDUSTRIES AUTOMOTIVE THERMAL SYSTEMS CO., LTD., Aichi (JP)

( * ) Notice: Subject to any disclaimer, the term of this patent is extended or adjusted under 35 U.S.C. 154(b) by 513 days.

(21) Appl. No.: 14/410,458

(22) PCT Filed: May 22, 2013

(86) PCT No.: PCT/JP2013/064229
§ 371 (c)(1),
(2) Date: Dec. 22, 2014

(87) PCT Pub. No.: WO2014/024541
PCT Pub. Date: Feb. 13, 2014

(65) Prior Publication Data
US 2015/0326090 A1    Nov. 12, 2015

(30) Foreign Application Priority Data

Aug. 10, 2012  (JP) ................................. 2012-178279

(51) Int. Cl.
*H02K 5/10*      (2006.01)
*H02K 11/00*    (2016.01)
(Continued)

(52) U.S. Cl.
CPC .............. *H02K 5/10* (2013.01); *F04B 35/04* (2013.01); *F04B 39/121* (2013.01); *H02K 5/225* (2013.01);
(Continued)

(58) Field of Classification Search
CPC .......... H02K 5/10; H02K 5/225; H02K 11/33; H02K 11/0094; F04B 35/04; F04B 39/121
See application file for complete search history.

(56) References Cited

U.S. PATENT DOCUMENTS

2006/0230781 A1   10/2006  Kawada et al.
2007/0115707 A1    5/2007  Koide
(Continued)

FOREIGN PATENT DOCUMENTS

EP    2 461 035 A1    6/2012
JP    2005-18665 A    1/2005
(Continued)

OTHER PUBLICATIONS

Office Action dated Dec. 30, 2015 in corresponding Chinese Patent Application No. 201380033602.0 with an English Translation.
(Continued)

*Primary Examiner* — Dang Le
(74) *Attorney, Agent, or Firm* — Birch, Stewart, Kolasch & Birch, LLP

(57) ABSTRACT

The purpose is to provide an inverter-integrated electrically driven compressor by which the danger of contacting an inverter device while power is being applied can be overcome in a reliable manner, without the need to provide any extra components, such as safety devices or the like. In this inverter-integrated electrically driven compressor, the inverter device is arranged housed within an inverter housing part hermetically sealed by a cover, and power and communication lines from an external power supply and a control device are connectable to the inverter device through connectors. The connector on the compressor side is furnished to the cover side, and at least one bolt of a fastening means for fastening the cover to the inverter housing part is furnished at location covered by the connector on the power (Continued)

line side, making access impossible, when the connector on the power line side has been coupled to the connector on the compressor side.

4 Claims, 4 Drawing Sheets

(51) Int. Cl.
    *F04B 35/04*         (2006.01)
    *F04B 39/12*         (2006.01)
    *H02K 5/22*          (2006.01)
    *H02K 11/33*        (2016.01)

(52) U.S. Cl.
    CPC ......... *H02K 11/0094* (2013.01); *H02K 11/33* (2016.01)

(56) References Cited

U.S. PATENT DOCUMENTS

| | | |
|---|---|---|
| 2009/0315418 A1 | 12/2009 | Hasegawa |
| 2011/0133575 A1 | 6/2011 | Arashi et al. |
| 2011/0211981 A1 | 9/2011 | Saito et al. |
| 2013/0328424 A1* | 12/2013 | Goto .................. H02K 5/18 310/64 |

FOREIGN PATENT DOCUMENTS

| | | |
|---|---|---|
| JP | 2005-143200 A | 6/2005 |
| JP | 2006-322444 A | 11/2006 |
| JP | 2007-113486 A | 5/2007 |
| JP | 2008-128142 A | 6/2008 |
| JP | 2008-202566 A | 9/2008 |
| JP | 2010-156271 A | 7/2010 |
| JP | 2012-47139 A | 3/2012 |
| JP | 2012-85416 A | 4/2012 |
| WO | WO 2010/073847 A1 | 7/2010 |

OTHER PUBLICATIONS

Chinese Notification on the Grant of Patent Right for Invention, dated Jul. 6, 2016, for Chinese Application No. 201380033602.0, with an English translation.

Japanese Decision of Patent Grant, dated May 10, 2016, for Japanese Application No. 2012-178279, with an English translation.

* cited by examiner

INVERTER-INTEGRATED ELECTRICALLY DRIVEN COMPRESSOR

TECHNICAL FIELD

The present invention relates to an inverter-integrated electrically driven compressor in which an inverter device is integrally incorporated into an inverter housing part of the housing.

BACKGROUND ART

Electric compressors that integrally incorporate an inverter device are used as air conditioner compressors installed in electric vehicles, hybrid vehicles, or the like. In an inverter-integrated electrically driven compressor, an inverter housing part is furnished on the outer periphery of the housing that houses a compressor and an electric motor that drives the compressor, and an inverter device that converts high voltage direct current power supplied from a power supply unit into three-phase alternating current power which is applied to the electric motor is arranged housed within the inverter housing part. Further, the inverter housing part is hermetically sealed by a cover.

The electric compressor for a vehicle air conditioner is normally installed in the engine compartment of the vehicle, but in the installed state it is frequently located where the cover that hermetically seals the inverter housing part can be accessed. In this case, it is possible to remove the cover without taking safety measures such as removing a connector of a power line that is connected to a high voltage power supply. Therefore, there is a danger that the cover can be removed while the power is still applied to the inverter device, and a high voltage part can be unintentionally touched.

Therefore, a technology is provided in Patent Documents 1 to 3 to ensure safety when removing the cover by providing an interlock mechanism that when the cover that seals the inverter housing part is removed by an operator in the case of maintenance of the inverter device or the like, the removal of another protective cover or an interlock plate furnished on the top surface of the cover automatically shuts off the power applied to the inverter device. Further, in Patent Document 4, a technology is provided in which a safety mechanism is furnished that disables removal of some of the fixing screws that fix the cover to the inverter housing part when the electric compressor is installed in the vehicle.

CITATION LIST

Patent Documents

Patent Document 1: Japanese Unexamined Patent Application Publication No. 2005-143200A
Patent Document 2: Japanese Unexamined Patent Application Publication No. 2006-322444A
Patent Document 3: Japanese Unexamined Patent Application Publication No. 2007-113486A
Patent Document 4: International Publication No. WO/2010/073847

SUMMARY OF THE INVENTION

Technical Problem

However, with the interlock mechanisms disclosed in Patent Documents 1 to 3 as a safety mechanism to avoid the danger of contacting the inverter device while power is being applied by removing the cover of the inverter housing part, in addition to the protective cover or interlock plate that are removably fitted to the cover or the like, it is essential to furnish a current control device such as an interlock switch mechanism or the like that is activated when the protective cover or interlock plate is fitted or removed. This produces problems such as the configuration of the inverter device becoming complex, space needing to be provided for installing the interlock mechanism, and inevitably the cost increasing.

On the other hand, in the technology disclosed in Patent Document 4, when installed in the vehicle, the safety cover installation position and the like are configured so that just by the additional installation of the safety cover, the cover is made impossible to be removed and access to the inverter device is impossible. However, there are still issues such as the increase in the number of components or assembly operations and the increase in cost associated therewith because it still requires a special safety cover, screws for fixing the cover, or the like.

The present invention has been made in view of such circumstances, and an object of the present invention is to provide an inverter-integrated electrically driven compressor by which the danger of contacting the inverter device while power is being applied can be overcome in a reliable manner, without the need to provide any extra components, such as safety devices or the like.

Solution to Problem

In order to solve the above problems, the inverter-integrated electrically driven compressor according to the present invention adopts the following means.

Namely, in the inverter-integrated electrically driven compressor according to the present invention, the inverter housing part, which has an inverter device arranged housed therewithin, is furnished on the outer periphery of a housing that houses a compressor and an electric motor, the inverter housing part is hermetically sealed by a cover, and power and communication lines from an external power supply and a control device are connectable to the inverter device through connectors. In such a compressor, a connector on the compressor side is furnished to the cover side, and at least one fastening means for fastening the cover to the inverter housing part is furnished at a location covered by a connector on the power line side, making access impossible, when the connector on the power line side is coupled to the connector on the compressor side.

According to the present invention, the connector on the compressor side that connects the power line and the communication line is furnished to the cover side, which hermetically seals the inverter housing part, and at least one fastening means that fastens the cover to the inverter housing part is furnished at a location covered by the connector on the power line side, making access impossible, when the connector on the power line side is coupled to the connector on the compressor side, so after the inverter-integrated electrically driven compressor is mounted on a vehicle or the like, as long as the connector on the power line side is not decoupled from the connector on the compressor side, the power line and the like remain connected to the inverter device, in other words when the connector on the power line side is coupled to the connector on the compressor side, one of the fastening means that fastens the cover to the inverter housing part is covered by the connector on the power line side, and it is not possible to access the fastening means, so it is difficult to remove the cover, and it is possible to eliminate the danger of contacting the internal inverter device while power is being applied, or the like in a reliable manner. Therefore, it is possible to ensure safety without providing any special safety mechanisms or interlock mechanisms or the like, and size reduction and cost reduction can be achieved by omitting these mechanisms.

Further, an inverter-integrated electrically driven compressor of a first aspect of the present invention is configured so that, in the above described inverter-integrated electrically driven compressor, the connector on the power line side is integrally configured from a power line connector and a communication line connector and configured so that the fastening means is covered from above by the communication line connector which is smaller than the power line connector.

According to the inverter-integrated electrically driven compressor of the first aspect of the present invention, the connector on the power line side is integrally configured from the power line connector and the communication line connector, and configured so that the fastening means is covered from above by the communication line connector which is smaller than the power line connector, so even when a certain amount of space is provided to avoid interference between the fastening means that fastens the cover and the communication line connector, because the communication line connector is smaller than the power line connector, the space is not restricted by the space provided for coupling and decoupling the power line connector to and from the connector on the compressor side, and the ideal space for each can be provided without difficulty. Therefore, by covering the fastening means with the communication line connector, the external shape of the inverter-integrated electrically driven compressor is not increased and can be kept small.

In addition, an inverter-integrated electrically driven compressor of a second aspect of the present invention is configured so that, in either of the above described inverter-integrated electrically driven compressors, the fastening means is a bolt which is accessible when the compressor is being assembled, and is not accessible via a tool when the connector on the power line side is coupled.

According to the inverter-integrated electrically driven compressor of the second aspect of the present invention, the fastening means is a bolt which is accessible when the compressor is being assembled, and is not accessible via a tool when the connector on the power line side is coupled, so when the electric compressor is being assembled, the cover can be fastened by tightening the bolt, but when mounted on the vehicle and the connector on the power line side is coupled, the bolt cannot be removed with a tool, so it is possible to eliminate the danger of removing the cover and contacting the inverter device while high voltage is being applied in a reliable manner. Therefore, it is not possible to access the inverter device until after the connector on the power line side is decoupled and the application of the power is cut off, so it is possible to ensure safety without providing special safety devices or the like.

Effect of the Invention

According to the present invention, after the inverter-integrated electrically driven compressor is mounted on a vehicle or the like, as long as the connector on the power line side is not decoupled from the connector on the compressor side, the power line and the like remain connected to the inverter device, in other words when the connector on the power line side is coupled to the connector on the compressor side, one of the fastening means that fastens the cover to the inverter housing part is covered by the connector on the power line side, and it is, not possible to access the fastening means, so it is difficult to remove the cover, and it is possible to eliminate the danger of contacting the internal inverter device while the power is being applied, or the like in a reliable manner; therefore safety can be ensured without providing any special safety mechanism or interlock mechanism or the like, and size reduction and cost reduction can be achieved by omitting these mechanisms.

DESCRIPTION OF THE INVENTION

The following is a description of an embodiment of the present invention with reference to FIGS. 1 to 4.

Figure 1:
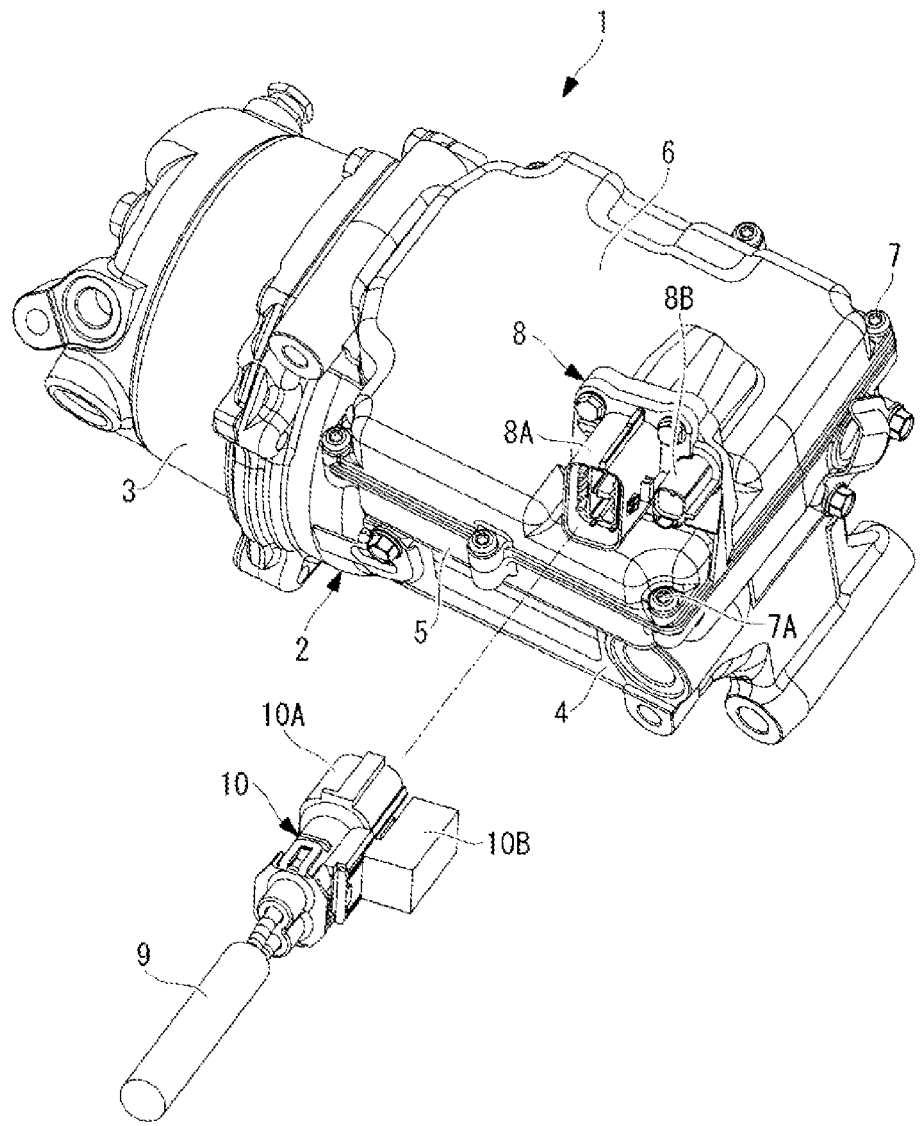
FIG. 1 is a perspective view of an inverter-integrated electrically driven compressor according to an embodiment of the present invention with a connector on a power line side coupled.
Figure 2:
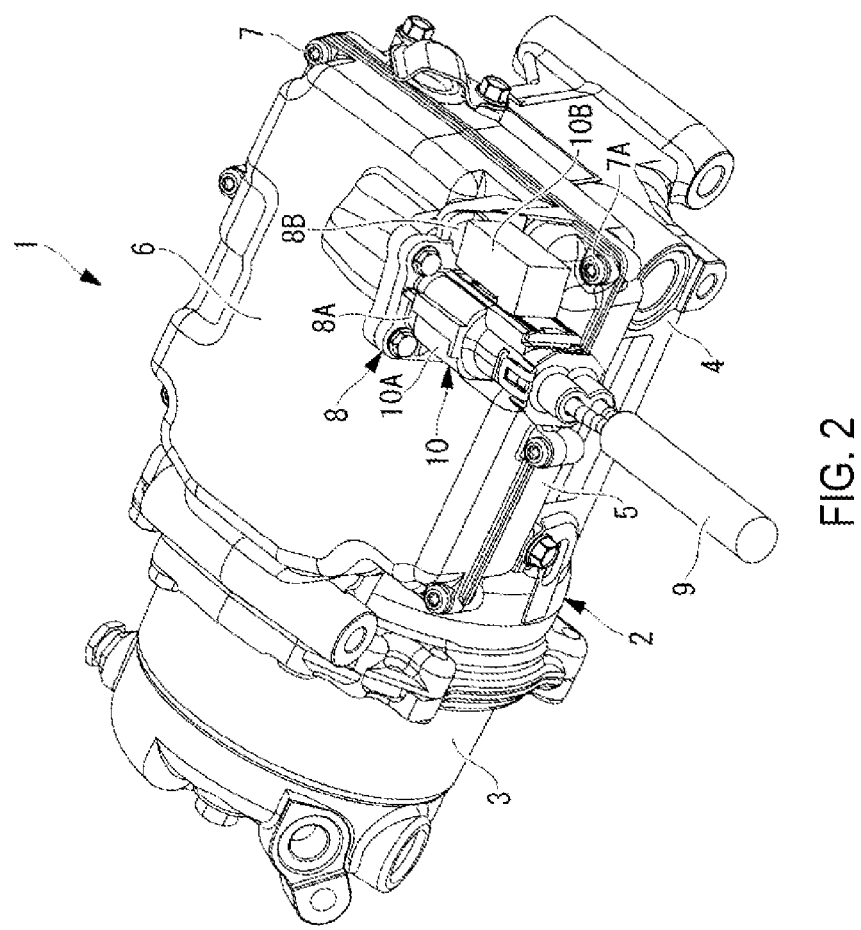
FIG. 2 is a perspective view of the inverter-integrated electrically driven compressor illustrated in FIG. 1 with the connector on the power line side decoupled.

FIG. 1 is a perspective view of an inverter-integrated electrically driven compressor according to an embodiment of the present invention with a connector on a power line side coupled, and FIG. 2 is a perspective view with the connector on the power line side decoupled.

An inverter-integrated electrically driven compressor 1 includes a housing 2 that houses therein an electric motor and a compressor driven by the electric motor, which are not illustrated on the drawings. The housing 2 is configured with an aluminum diecast motor housing 3 and compressor housing 4 integrally coupled.

An inverter housing part 5 is integrally formed on the outer periphery of the motor housing 3 that houses the electric motor in the housing 2. The inverter housing part 5 has a box shape with the top surface open, configured so that an inverter device, which is not illustrated on the drawings, is arranged housed therewithin. The inverter device converts high voltage direct current power supplied from a power supply unit into three-phase alternating current power to be applied to the electric motor, and may be a commonly-known inverter device configured from a power board, on which is mounted a switching circuit configured from high voltage components, such as a smoothing capacitor or a common mode coil, and semiconductor switching elements such as an IGBT; and from a CPU board on which is mounted a control and communication circuit configured from elements, such as a CPU, that operate at low voltage, and the like.

It is necessary for the inverter device to be ensured insulation, isolation from moisture, isolation from vibration, cooling, and the like. The inverter device is arranged housed within the inverter housing part 5 with measures taken to deal with these issues. The opening of the top surface of the inverter housing part 5 is hermetically sealed with a waterproof structure using a cover 6 that is fixed by tightening a plurality of bolts 7.

A connector 8 on a compressor side is furnished on the rear side of the top surface of the cover 6 for connecting a power line or a communication line that applies direct current power or control signals from an power supply unit (battery) installed on the vehicle side or a control device (ECU) on the inverter device side, or a communication line for an interlock. The connector 8 on the compressor side has a power line connector 8A and a communication line connector 8B integrally provided therein, that is electrically connected to the inverter device installed within the inverter housing part 5. Note that, in the present invention, the communication line connector 8B includes one or a plurality of connectors that connect a communication line for control signals and/or a communication line for an interlock that checks the connection of the power line connector 8A.

A connector 10 on a power line side furnished at one end of an electrical cable (power line and communication line) 9 that combines the power line and the communication line described above into a single cable is removably coupled to the connector 8 on the compressor side furnished on the cover 6 side. The connector 10 on the power line side has a power line connector 10A and a communication line connector 10B integrally provided therein, that can be inserted into the connector 8 on the compressor side from a direction approximately parallel to the top surface of the cover 6. Note that the communication line connector 10B is a connector configured to be compatible with the communication line connector 8B.

When mounted on a vehicle such as an electric vehicle or hybrid vehicle, the inverter-integrated electrically driven compressor 1 is normally installed, directly or via a compressor mounting bracket or the like, on the motor or engine body (mounted portion) or the vehicle body frame in the engine compartment. Then, high voltage direct current power is supplied to the inverter device incorporated in the inverter-integrated electrically driven compressor 1 from the power supply unit installed in the vehicle via the electrical cable 9. Therefore during maintenance or the like, if the cover 6 of the inverter housing part 5 is removed while the connector 10 on the power line side is still connected to the connector 8 on the compressor side, there will be a danger of contacting high voltage.

Figure 3:
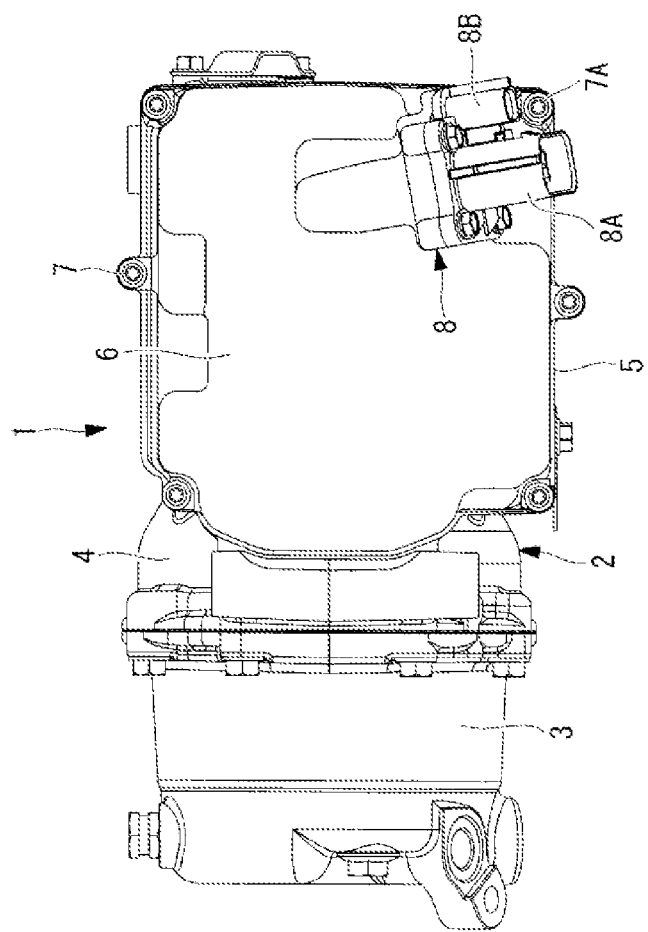
FIG. 3 is a plan view of the inverter-integrated electrically driven compressor illustrated in FIG. 1 with the connector on the power line side decoupled.
Figure 4:
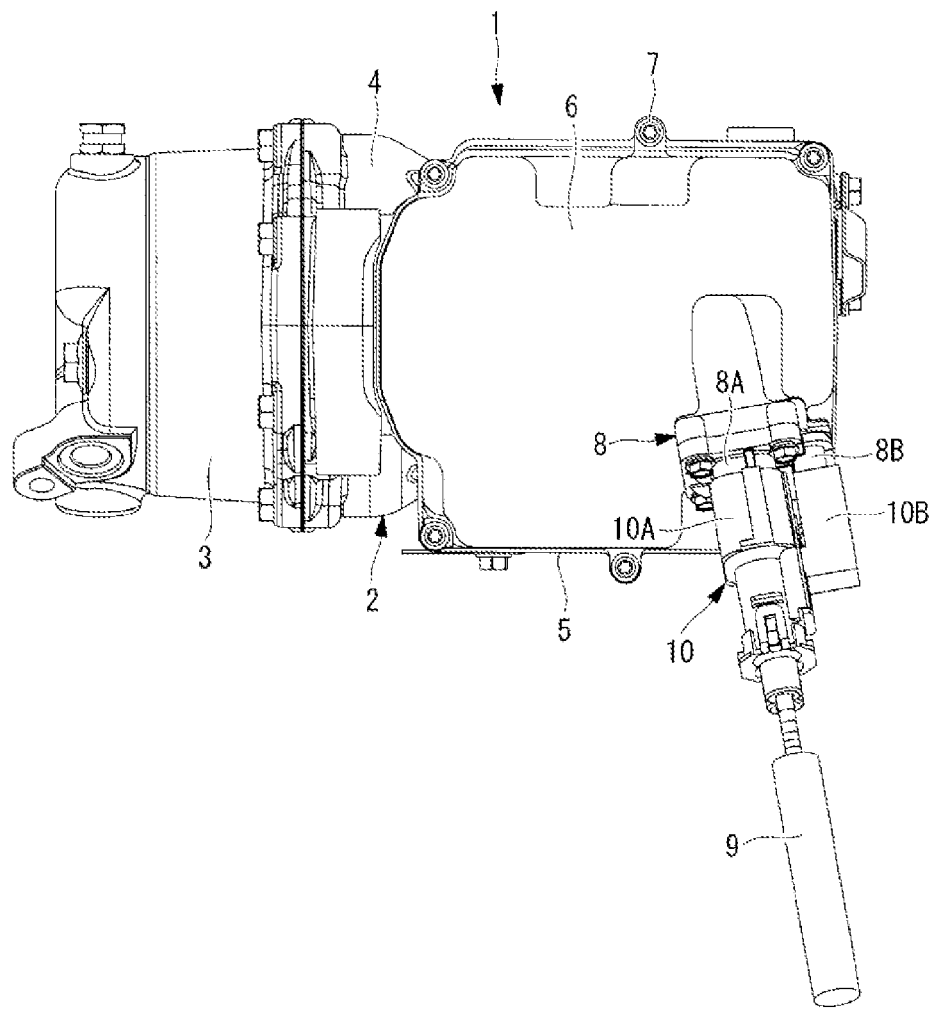
FIG. 4 is a plan view of the inverter-integrated electrically driven compressor illustrated in FIG. 1 with the connector on the power line side coupled.

In order to eliminate this danger, in the present embodiment, as illustrated in FIG. 3, the connector 8 on the compressor side is furnished near at least one bolt 7A of a plurality of bolts (fastening means) 7 that fasten the cover 6 to the inverter housing part 5, so that when the connector 10 on the power line side is coupled to the connector 8 on the compressor side as illustrated in FIG. 4, the bolt 7A is covered from above by a portion of the connector 10 on the power line side, namely the communication line connector 10B, making it impossible to access, such as remove or fasten, the bolt 7A with a tool.

In other words, when the inverter-integrated electrically driven compressor 1 is being assembled, the connector 10 on the power line side is not coupled to the connector 8 on the compressor side, and the space above the bolt 7A is open as illustrated in FIG. 3, so the operation of tightening the bolt 7A can be carried out. However, when the inverter-integrated electrically driven compressor 1 is installed in the vehicle and the connector 10 on the power line side is coupled, as illustrated in FIG. 4, the communication line connector 10B covers the space above the bolt 7A, so it is difficult to access and remove the bolt 7A with a tool such as a screw wrench, and remove the cover 6 from the inverter housing part 5.

Further, the connector that covers the space above the bolt 7A may be either the power line connector 10A or the communication line connector 10B of the connector 10 on the power line side, but in this embodiment the bolt 7A is covered from above by the communication line connector 10B. In order to insert and couple the connector 10 on the power line side to the connector 8 on the compressor side, it is necessary to provide a certain amount of space between the top surface of the cover 6 and the connectors, and at the same time it is necessary to provide space to avoid interference with the bolt 7A. Because normally the communication line connector 10B is smaller than the power line connector 10A, it is possible to provide, without difficulty, the space to avoid interference with the bolt 7A by covering the space above the bolt 7A with the communication line connector 10B.

According to the configuration as described above, the present embodiment has the following action and effects.

As illustrated in FIGS. 2 and 4, when installed in a vehicle, the inverter-integrated electrically driven compressor 1 is connected to the vehicle installed power supply unit (battery) and the control device (ECU) via the electrical cable 9 and driven by power supplied from the power supply unit to the inverter device installed within the inverter housing part 5. This power is high voltage direct current power that is converted by the inverter device into three-phase alternating current power at the frequency instructed by the control device (ECU), and applied to the electric motor installed within the housing 2.

In the inverter-integrated electrically driven compressor 1, when it is necessary to carry out the maintenance of the inverter device, the cover 6 that hermetically seals the inverter housing part 5 must be removed. However if the cover 6 is removed without taking some safety measure such as removing the connector 10 of the electrical cable 9, there is a danger of unintentionally contacting the high voltage applied to the inverter device. To eliminate this danger, in the present embodiment, if the connector 10 of the electrical cable 9 is not decoupled from the connector 8 on the compressor side, it will be impossible to remove the bolt 7A that fastens the cover 6 to the inverter housing part 5.

In other words, the connector 8 on the compressor side for connecting the electrical cable 9 which combines the power line and the communication line is furnished on the cover 6 side which hermetically seals the inverter housing part 5, and at least one bolt 7A of the plurality of bolts (fastening means) 7 that fasten the cover 6 to the inverter housing part 5 is furnished at a location covered by the communication line connector 10B of the connector 10 on the power line side, making access impossible, when the connector 10 on the power line side furnished at one end of the electrical cable 9 is coupled to the connector 8 on the compressor side.

Therefore, after the inverter-integrated electrically driven compressor 1 is installed in the vehicle or the like, as long as the connector 10 on the power line side is not decoupled from the connector 8 on the compressor side, at least one bolt 7A of the bolts 7 fastening the cover 6 to the inverter housing part 5 is covered by the connector 10 on the power line side and cannot be accessed when the electrical cable 9 is connected to the inverter device, in other words when the connector 10 on the power line side is coupled to the connector 8 on the compressor side, so it is difficult to remove the cover 6, and it is possible to avoid the danger of contacting the internal inverter device while power is being applied.

Therefore, it is possible to ensure safety without providing any special safety mechanisms or interlock mechanisms or the like, and size reduction and cost reduction can be achieved by omitting these mechanisms.

Further, the connector 10 on the power line side as described above is configured integrally from the power line connector 10A and the communication line connector 10B, and the bolt 7A is covered from above by the communication line connector 10B which is smaller than the power line connector 10A. Therefore, even when a certain amount of space is provided to avoid interference between the bolt 7A that fastens the cover 6 and the communication line connector 10B, because the communication line connector 10B is smaller than the power line connector 10A, this space is not restricted by the space provided for coupling and decoupling the connector 10 on the power line side to and from the connector 8 on the compressor side, and the ideal space can be provided for each without difficulty. Therefore, by covering the bolt 7A with the communication line connector 10B, the external shape of the inverter-integrated electrically driven compressor 1 is not increased and can be kept small.

In addition, in the present embodiment, the fastening means for fastening the cover 6 is the bolts 7 which can be accessed when the inverter-integrated electrically driven compressor 1 is being assembled and cannot be accessed via a tool when the connector 10 on the power line side is coupled to the connector 8 on the compressor side. Therefore, when the inverter-integrated electrically driven compressor 1 is being assembled, the cover 6 can be fastened by tightening the bolt 7A, but when mounted on the vehicle and the connector 10 on the power line side is coupled, the bolt 7A cannot be removed with a tool, so it is possible to eliminate, in a reliable manner, the danger of removing the cover 6 and contacting the inverter device while high voltage is being applied. Therefore, it is not possible to access the inverter device until after the connector 10 on the power line side is decoupled and the application of the power is cut off, so it is possible to ensure safety without providing special safety devices or the like.

Note that the present invention is not limited to the invention according to the embodiment as described above, and changes can be made as appropriate without departing from the gist thereof. For example, in the embodiment as described above, an example has been described in which the inverter housing part 5 is integrally formed on the outer periphery on the motor housing 3 side, but the inverter housing part 5 may be furnished at any location on the outer periphery, such as an end surface of the housing 2 or the like. Further, there is no particular limitation on the shape, size or the like of the inverter housing part 5.

In addition, in the present embodiment, the direction of coupling of the connector 8 on the compressor side to the connector 10 on the power line side is a direction along the top surface of the cover, and the number of bolts 7A covered by the connector 10 on the power line side is one, but the direction and the number may of course be changed as appropriate in accordance with the mounting posture or mounting condition with respect to the vehicle. Further, the embodiment as described above is configured with the communication line connector 10B, which is smaller than the power line connector 10A, covering the space above the bolt 7A, but a configuration in which the bolt 7A is covered from above by the power line connector 10A is not excluded, and of course a configuration in which the bolt 7A is covered from above by the power line connector 10A may be adopted.

Further, in the embodiment as described above, an example has been described in which the power line connector 8A and the communication line connector 8B, and the power line connector 10A and the communication line connector 10B are integrated, but the present invention can also be applied to a configuration in which the communication line for control signals and the power line for direct current power from the power supply unit are connected to their connectors at separated locations, and in this case at least one bolt 7A is covered from above by the connector on the power line side. However, in the case of this configuration, a communication line connector for an interlock that checks the connection of the power line connector is furnished on the power line connector side, so the bolt 7A may be covered from above by this communication line connector.

REFERENCE SIGNS LIST

1 Inverter-integrated electrically driven compressor
2 Housing
5 Inverter housing part
6 Cover
7, 7A Bolt (fastening means)
8 Connector on the compressor side
9 Electrical cable (power line and communication line)
10 Connector on the power line side
10A Power line connector
10B Communication line connector

The invention claimed is:

1. An inverter-integrated electrically driven compressor having an inverter housing part, the inverter housing part having an inverter device arranged housed therewithin and being furnished on an outer periphery of a housing, the housing housing a compressor and an electric motor, the inverter housing part being hermetically sealed by a cover, and power and communication lines from an external power supply and a control device being connectable to the inverter device through connectors, the compressor comprising:
   a connector on a compressor side furnished to the cover side, and
   at least one fastening means for fastening the cover to the inverter housing part furnished at a location covered by a connector on a power line side, making access impossible, when the connector on the power line side is coupled to the connector on the compressor side.

2. The inverter-integrated electrically driven compressor according to claim 1, wherein the connector on the power line side is integrally configured from a power line connector and a communication line connector, and configured so that the fastening means is covered from above by the communication line connector, the communication line connector being smaller than the power line connector.

3. The inverter-integrated electrically driven compressor according to claim 2, wherein the fastening means is a bolt, the bolt being accessible when the compressor is being assembled, and the bolt being not accessible via a tool when the connector on the power line side is coupled.

4. The inverter-integrated electrically driven compressor according to claim 1, wherein the fastening means is a bolt, the bolt being accessible when the compressor is being assembled, and the bolt being not accessible via a tool when the connector on the power line side is coupled.

* * * * *